United States Patent
Cho et al.

(10) Patent No.: US 10,481,461 B2
(45) Date of Patent: Nov. 19, 2019

(54) REVERSIBLE ELECTROCHEMICAL MIRROR

(71) Applicant: ELECTRONICS AND TELECOMMUNICATIONS RESEARCH INSTITUTE, Daejeon (KR)

(72) Inventors: Seong-Mok Cho, Daejeon (KR); Sujung Kim, Daejeon (KR); Tae-Youb Kim, Daejeon (KR); Juhee Song, Daejeon (KR); Chil Seong Ah, Daejeon (KR); Yong Hae Kim, Daejeon (KR); Joo Yeon Kim, Daejeon (KR); Hojun Ryu, Seoul (KR); Jeong Ik Lee, Daejeon (KR); Sang Hoon Cheon, Daejeon (KR); Chi-Sun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/945,405

(22) Filed: Apr. 4, 2018

(65) Prior Publication Data
US 2019/0025665 A1   Jan. 24, 2019

(30) Foreign Application Priority Data
Jul. 21, 2017 (KR) .................. 10-2017-0092951

(51) Int. Cl.
*G02F 1/19* (2019.01)
*G02F 1/163* (2006.01)
*G02F 1/155* (2006.01)

(52) U.S. Cl.
CPC ............... *G02F 1/19* (2013.01); *G02F 1/163* (2013.01); *G02F 2001/1555* (2013.01); *G02F 2201/12* (2013.01)

(58) Field of Classification Search
CPC .......................... G02F 1/19; G02F 2201/12
USPC ......................................................... 359/263
See application file for complete search history.

(56) References Cited

U.S. PATENT DOCUMENTS

| 7,982,231 B2 | 7/2011 | Kim et al. | |
| 2007/0053046 A1* | 3/2007 | Tench | G02F 1/155 359/237 |
| 2016/0054632 A1 | 2/2016 | Toko et al. | |
| 2016/0154288 A1 | 6/2016 | Kim et al. | |

OTHER PUBLICATIONS

Shingo Araki et al., "Electrochemical Optical-Modulation Device with Reversible Transformation Between Transparent, Mirror, and Black", Advanced Materials, May 10, 2012, vol. 24, No. 23, OP122-OP126.

* cited by examiner

*Primary Examiner* — Wen Huang
(74) *Attorney, Agent, or Firm* — Rabin & Berdo, P.C.

(57) ABSTRACT

Provided is a reversible electrochemical mirror including a first substrate and a second substrate, which face each other, a first transparent electrode disposed on the first substrate and facing the second substrate, a second transparent electrode disposed on the second substrate and facing the first transparent electrode, an electrolyte solution interposed between the first transparent electrode and the second transparent electrode, and a counter electrode material layer disposed on the second transparent electrode and contacting the electrolyte solution.

8 Claims, 5 Drawing Sheets

REVERSIBLE ELECTROCHEMICAL MIRROR

CROSS-REFERENCE TO RELATED APPLICATION

This U.S. non-provisional patent application claims priority under 35 U.S.C. § 119 of Korean Patent Application No. 10-2017-0092951, filed on Jul. 21, 2017, the entire contents of which are hereby incorporated by reference.

BACKGROUND

The present disclosure herein relates to a reversible electrochemical mirror.

Reversible electrochemical mirrors using reversible electrodeposition techniques are devices that can be reversibly transformed between mirror and transparent states through a method in which metals, such as silver (Ag) or bismuth (Bi) and the like, are electrodeposited on or removed from a transparent electrode through electrochemical methods. Due to having the innate property of mirror/transparent state transformation, reversible mirrors based on reversible electrodeposition techniques are expected to be utilized in various ways, for instance, as smart windows or as design devices in electronic products and the like.

Such reversible electrochemical mirrors based on reversible electrodeposition techniques are typically configured to have an electrolyte positioned between two substrates including electrodes. The reversible electrochemical mirror may become either a mirror or transparent as metal ions dissolved in the electrolyte are either electrodeposited or re-dissolved depending on whether or not voltage is applied to the electrodes.

In typical reversible electrochemical mirrors, voltage must be continuously applied to maintain the mirror state, and thus there are limitations in that power consumption is significant and increasing the surface of the mirrors is difficult.

SUMMARY

The present disclosure provides a method for manufacturing a reversible electrochemical mirror that can be operated at low power and exhibits excellent performance.

An embodiment of the inventive concept provides a reversible electrochemical mirror including a first substrate and a second substrate, which face each other; a first transparent electrode disposed on the first substrate and facing the second substrate; a second transparent electrode disposed on the second substrate and facing the first transparent electrode; an electrolyte solution interposed between the first transparent electrode and the second transparent electrode; and a counter electrode material layer disposed on the second transparent electrode and contacting the electrolyte solution.

In an embodiment, the counter electrode material layer may include an ion storage material or an electrochromic material.

In an embodiment, the counter electrode material layer may include at least one out of tungsten oxide ($WO_3$), cerium oxide ($CeO_2$), titanium oxide ($TiO_2$), nickel oxide (NiO), molybdenum oxide ($MoO_3$), cobalt oxide ($CoO_2$), iridium oxide ($IrO_2$), and tin oxide ($SnO_2$).

In an embodiment, the reversible electrochemical mirror may further include a metal layer disposed on the first transparent electrode and contacting the electrolyte solution.

In an embodiment, the electrolyte solution may include ions of a metal included in the metal layer.

In an embodiment, the metal layer may be silver (Ag) or bismuth (Bi), and the electrolyte solution may include silver ions or bismuth ions.

In an embodiment, the electrolyte solution may further include lithium ions, and the lithium ions may bond with a material forming the counter electrode material layer when a negative voltage is applied to the second transparent electrode.

In an embodiment, the lithium ions may be separated from a material forming the counter electrode material layer when a negative voltage is applied to the first transparent electrode.

In an embodiment, the electrolyte solution may further include at least one solvent selected from water, dimethyl sulfoxide (DMSO), propylene carbonate, and ethylene glycol.

In an embodiment, the electrolyte solution may desirably not include copper ions.

In an embodiment, the first and second transparent electrodes may include ITO or FTO.

In an embodiment, when a negative voltage is applied to the first transparent electrode, a metal layer may be electrodeposited on the first transparent electrode such that the reversible electrochemical mirror becomes a mirror state, and when a negative voltage is applied to the second transparent electrode, the metal layer may dissolve into the electrolyte solution such that the reversible electrochemical mirror becomes a transparent state.

DETAILED DESCRIPTION

Figure 1:
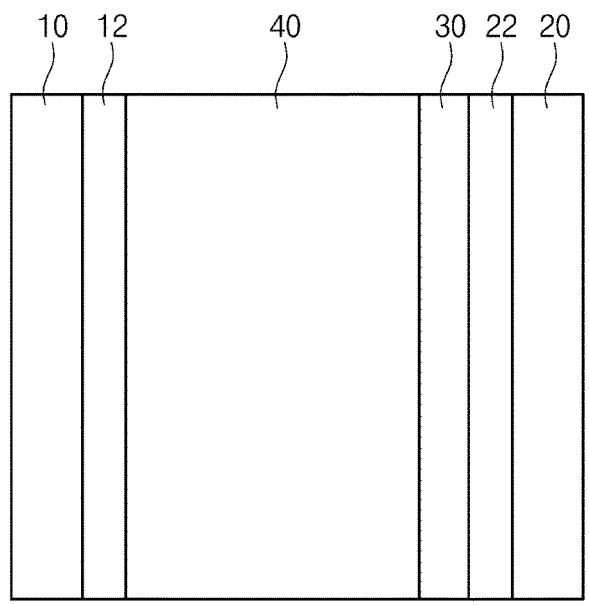
FIG. 1 is a cross-sectional view of a reversible electrochemical mirror according to an embodiment of the inventive concept.

Objects described above of the inventive concept, and other objects, features, and advantages of the inventive concept can be easily understood through exemplary embodiments related to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Herein, when an element is referred to as being on another element, it can be directly on the other element, or a third element may be interposed therebetween. Moreover, in the drawings, the thickness of elements is exaggerated for effective description of the technical contents.

Embodiments described herein will be described with reference to cross-sectional views and/or plan views that are idealized exemplary figures. In the drawings, the thickness of films and regions are exaggerated for effective description of the technical contents. Thus, the form in the idealized exemplary figures may be modified due to manufacturing techniques and/or tolerances and the like. Therefore, embodiments of the inventive concept are not limited to the particular forms illustrated herein, but instead, include modifications introduced due to the manufacturing process. For example, an etched region illustrated as forming a right angle may be rounded or have a predetermined curvature. Thus, regions exemplified in the drawings have features, and the shape of the exemplified regions are for exemplifying particular forms of regions in an element, and are not intended to limit the scope of the inventive concept. It will be understood that, although the terms first, second, etc. may be used in various embodiments herein to describe various elements, these elements should not be limited by these terms. These terms are only used to distinguish one element from another element. Embodiments herein also include their complementary embodiments.

The terminology used herein is for the purpose of describing particular embodiments only and is not intended to be limiting of the invention. As used herein, singular forms are intended to include their plural forms as well, unless the context clearly indicates otherwise. As used herein, the terms 'comprise' and/or 'comprising' specify the presence of stated elements, and do not preclude the presence or addition of one or more other elements.

Hereinafter, the present invention will be explained in detail with reference to the accompanying drawings FIG. 1 is a cross-sectional view of a reversible electrochemical mirror according to an embodiment of the inventive concept.

Referring to FIG. 1, a reversible electrochemical mirror 100 according to an embodiment includes a first substrate 10 and a second substrate 20, which face each other. The first substrate 10 and second substrate 20 may be transparent. For example, the first substrate 10 and second substrate 20 may include glass or plastic. A first transparent electrode 12 facing the second substrate 20 is disposed on the first substrate 10. A second transparent electrode 22 facing the first substrate 10 is disposed on the second substrate 20. The first transparent electrode 12 and second transparent electrode 22 may include, for example, indium tin oxide (ITO) or fluorine-doped tin oxide (FTO).

A counter electrode material layer 30 is disposed on the second transparent electrode 22. The counter electrode material layer 30 may face the first transparent electrode 12. The counter electrode material layer 30 may include an ion storage material or an electrochromic material. During operation of the reversible electrochemical mirror 100, the ion storage material or electrochromic material may participate in a reduction reaction or oxidation reaction that involves receiving or letting go of ions and electrons of an electrolyte solution 40. Here, although the operation mechanism is the same, the ion storage material is able to maintain a transparent state in both the reduction reaction and the oxidation reaction, whereas the electrochromic material may change color as a result of the reduction reaction or oxidation reaction. When composed of the electrochromic material, the counter electrode material layer 30, like colored glass, may be transparent while displaying color. The counter electrode material layer 30 may include at least one out of tungsten oxide ($WO_3$), cerium oxide ($CeO_2$), titanium oxide ($TiO_2$), nickel oxide (NiO), molybdenum oxide ($MoO_3$), cobalt oxide ($CoO_2$), iridium oxide ($IrO_2$), and tin oxide ($SnO_2$). The tungsten oxide ($WO_3$) and nickel oxide (NiO) may, for example, correspond to the electrochromic material. The cerium oxide ($CeO_2$) and titanium oxide ($TiO_2$) may, for example, correspond to the ion storage material.

Although not shown, a partition wall or spacer may be disposed between the first substrate 10 and second substrate 20. Accordingly, there may be a space between the first transparent electrode 12 and the counter electrode material layer 30, and the space may be filled with the electrolyte solution 40. The first transparent electrode 12 and the counter electrode material layer 30 may contact the electrolyte solution 40. The electrolyte solution 40 may include silver ions ($Ag^+$) or bismuth ions ($Bi^{3+}$). The electrolyte solution 40 may further include lithium ions. Specifically, the electrolyte solution 40 may include at least one solvent selected from water, dimethyl sulfoxide (DMSO), propylene carbonate, and ethylene glycol. The electrolyte solution 40 may further include silver nitrate ($AgNO_3$) and lithium bromide (LiBr) dissolved in the solvent. The silver nitrate ($AgNO_3$) and lithium bromide (LiBr) may dissolve and thereby be ionized into silver ions ($Ag^+$), bromide ions ($Br^-$), lithium ions ($Li^+$), and nitrate ions ($NO_3^-$). The electrolyte solution 40 may further include a polymer. The polymer may function as an electrolyte stiffener. The polymer may be, for example, polyvinyl butyral (PVB). The electrolyte solution 40 may exclude copper ions.

The reversible electrochemical mirror 100 in FIG. 1 may be in a transparent state when initially manufactured.

Figure 2:
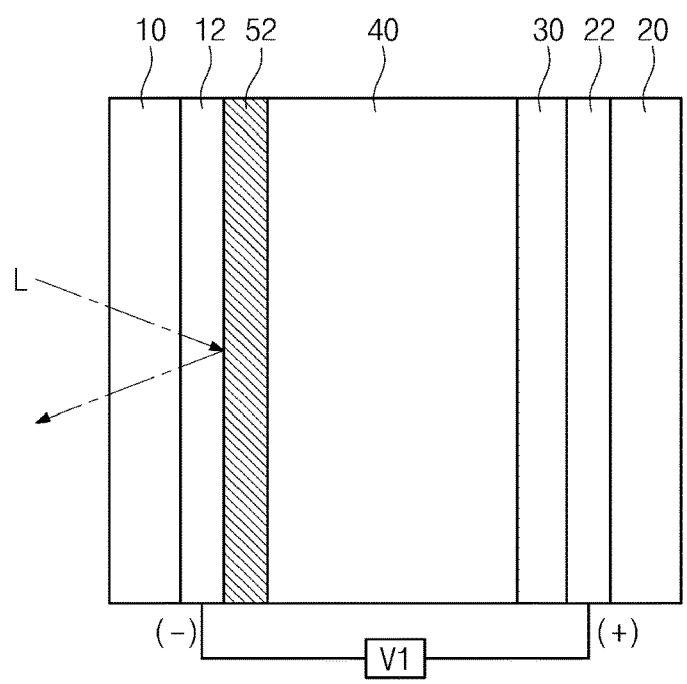
FIG. 2 illustrates an electrodeposition operation of the reversible electrochemical mirrors in FIGS. 1 and 4.
Figure 3:
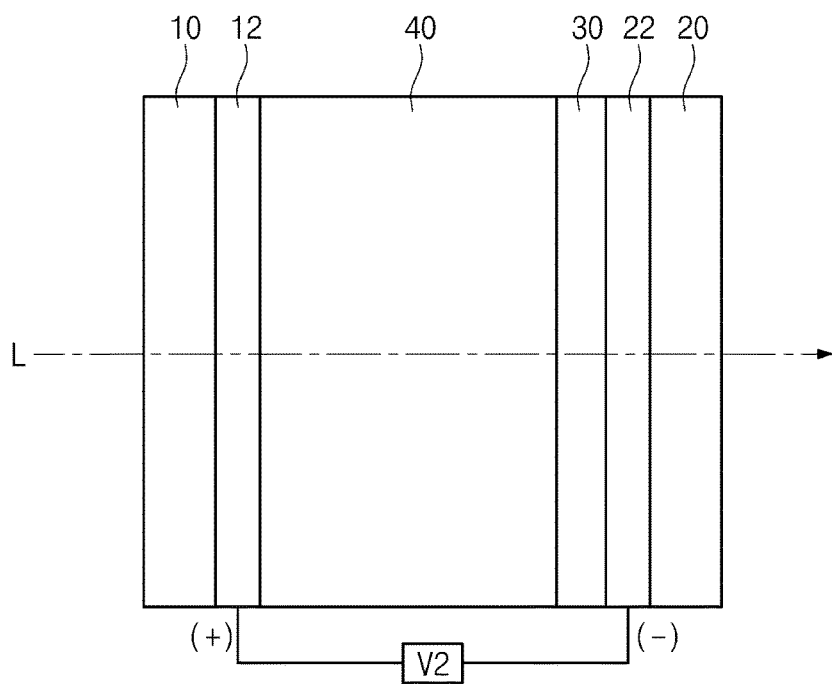
FIG. 3 illustrates an erasure operation of the reversible electrochemical mirror in FIG. 1.

Operation of the reversible electrochemical mirror 100 in FIG. 1 will be described. FIG. 2 illustrates an electrodeposition operation of the reversible electrochemical mirrors in FIGS. 1 and 4. FIG. 3 illustrates an erasure operation of the reversible electrochemical mirror in FIG. 1.

Referring to FIG. 2, in order for the reversible electrochemical mirror 100 to become a mirror state, a negative voltage may be applied to the first transparent electrode 12 and a positive voltage may be applied to the second transparent voltage 22 in the reversible electrochemical mirror 100 in FIG. 1. A positive electrodeposition voltage V1 may be applied to the second transparent electrode 22 relative to the first transparent electrode 12. Thus, in the state illustrated in FIG. 2, metal ions in the electrolyte solution 40 may receive electrons from the first transparent electrode 12, thereby being reduced and forming an electrodeposited metal layer 52 on the first transparent electrode 12 as illustrated in FIG. 3. Accordingly, the reversible electrochemical mirror 100 becomes a mirror state, and light L incident through the first substrate 10 may be reflected at the surface of the metal layer 52.

Referring to FIG. 3, in order for the reversible electrochemical mirror 100 to become a transparent state, a positive voltage may be applied to the first transparent electrode 12 and a negative voltage may be applied to the second transparent electrode 22. A negative erasure voltage V2 may be applied to the second transparent electrode 22 relative to the first transparent electrode 12. As a result, the metal layer 52 in FIG. 2 may be dissolved into the electrolyte solution 40. After a predetermined amount of time, the metal layer 52 may be completely dissolved such that the first transparent electrode 12 contacts the electrolyte solution 40. The reversible electrochemical mirror 100 becomes the transparent state, and light L incident through the first substrate 10 may pass through the reversible electrochemical mirror 100.

The electrodeposition operation in the reversible electrochemical mirror 100 in FIG. 1 may proceed via reactions such as those below when the counter electrode material layer 30 is composed of tungsten oxide, the metal layer 52 is composed of silver, and the electrolyte solution 40 includes silver nitrate ($AgNO_3$) and lithium bromide (LiBr).

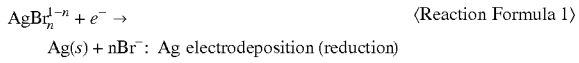

$AgBr_n^{1-n} + e^- \rightarrow$  ⟨Reaction Formula 1⟩
Ag(s) + nBr⁻: Ag electrodeposition (reduction)

$\frac{3}{2}Br^- \rightarrow \frac{1}{2}Br_3^- + e^-$: oxidation of Br⁻  ⟨Reaction Formula 2⟩

The reduction reaction of Reaction Formula 1 may occur on the first transparent electrode 12, and the oxidation reaction of Reaction Formula 2 may occur on the second transparent electrode 22.

Moreover, the erasure operation in the reversible electrochemical mirror 100 in FIG. 2 may proceed via reactions such as those below.

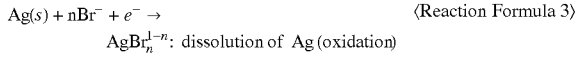

Ag(s) + nBr⁻ + e⁻ →  ⟨Reaction Formula 3⟩
$AgBr_n^{1-n}$: dissolution of Ag (oxidation)

$\frac{1}{2}Br_3^- + e^- \rightarrow \frac{3}{2}Br^-$: reduction of $Br_3^-$  ⟨Reaction Formula 4⟩

The oxidation reaction of Reaction Formula 3 may occur on the metal layer 52, and the reduction reaction of Reaction Formula 4 may occur on the second transparent electrode 22.

During the dissolution operation of silver (Ag), the counter electrode material layer 30 may be reduced before the arrival of $Br_3^-$ ions, and perform the role of a mediator that temporarily receives electrons generated upon Ag dissolution (oxidation), and then slowly gives and receives $Br_3^-$ ions and electrons.

Typical reversible electrochemical mirrors do not include the counter electrode material layer 30, and typical electrolyte solutions include copper ions. In typical reversible electrochemical mirrors, the copper ions receive electrons, thereby being reduced from $Cu^{2+}$ to $Cu^+$ before the arrival of $Br_3^-$ to an electrode, and after Ag is dissolved, the $Br_3^-$ ions and $Cu^+$ ions slowly exchange charges. In the case of a typical reversible electrochemical mirror, when the electrodeposition voltage is removed after an electrodeposition operation, the copper ions in the electrolyte solution dissolve the electrodeposited silver, thereby transforming the reversible electrochemical mirror into a transparent state. For the typical reversible electrochemical mirror to maintain a mirror state, silver must be continuously electrodeposited to replenish the losses to a silver thin film (corresponding to the metal layer 52) caused by copper ions, and thus power is continuously consumed. In this case, when the surface area of the reversible electrochemical mirror becomes large, a voltage drop is formed between the edges and central portion of the reversible electrochemical mirror, and thus there is a limitation in that increasing the size of the reversible electrochemical mirror is difficult.

However, in an embodiment of the inventive concept, the counter electrode material layer 30 performs the role of a temporary mediator that gives and receives $Br_3^-$ ions and electrons, and thus silver may be cleanly dissolved without the presence of copper ions. Moreover, since the electrolyte solution 40 according to an embodiment of the inventive concept does not include copper, silver dissolution caused by copper ions does not occur, and thus the reversible electrochemical mirror according to an embodiment of the inventive concept may consume less current and exhibit better bistability (the ability to maintain a mirror state when power is off) than typical reversible electrochemical mirrors.

Figure 4:
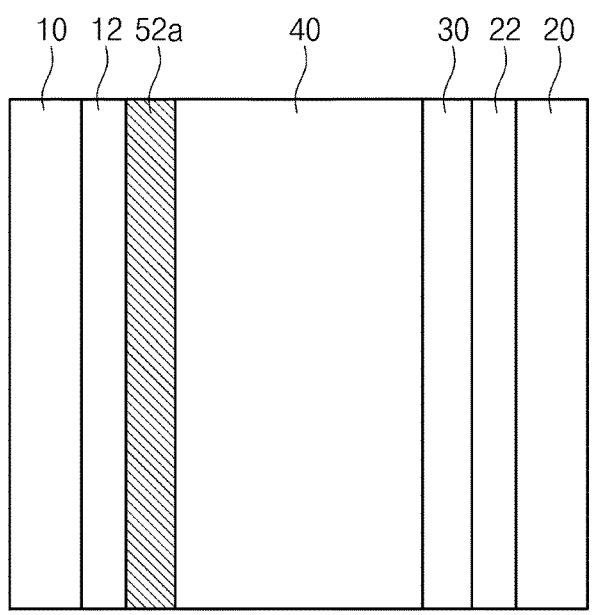
FIG. 4 is a cross-sectional view of a reversible electrochemical mirror according to another embodiment of the inventive concept.

FIG. 4 is a cross-sectional view of a reversible electrochemical mirror according to another embodiment of the inventive concept.

Referring to FIG. 4, in a reversible electrochemical mirror 101 according to the present embodiment, a deposited metal layer 52a may be disposed on the first transparent electrode 12 in FIG. 1. The deposited metal layer 52a may face the counter electrode material layer 30. The deposited metal layer 52a may be deposited by a deposition operation, such as CVD, PVD, or sputtering, when manufacturing the reversible electrochemical mirror 101. That is, in the present embodiment, the deposited metal layer 52a may already exist in a deposited state in an initial state of the reversible electrochemical mirror 101 prior to operation. Thus, the reversible electrochemical mirror 101 according to the present embodiment, due to the deposited metal layer 52a, may be in a mirror state in the initial state.

Figure 5:
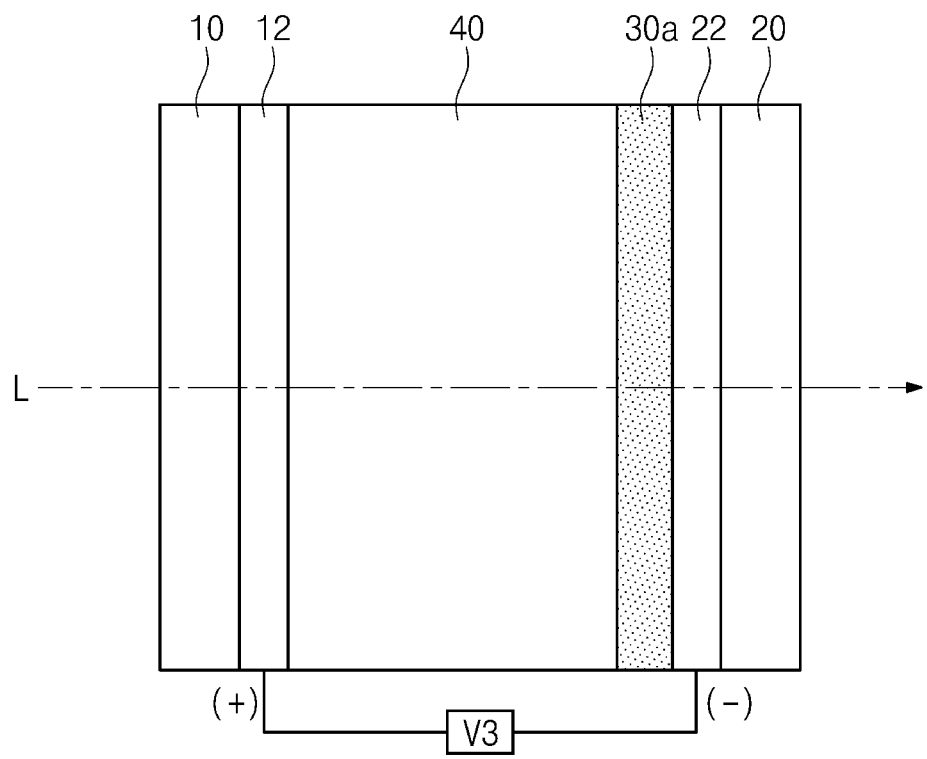
FIG. 5 illustrates an erasure operation of the reversible electrochemical mirror in FIG. 4.

FIG. 5 illustrates an erasure operation of the reversible electrochemical mirror in FIG. 4.

Referring to FIG. 5, in order for the reversible electrochemical mirror 101 to become a transparent state, a positive voltage may be applied to the first transparent electrode 12, and a negative voltage may be applied to the second transparent electrode 22. A negative erasure voltage V3 may be applied to the second transparent electrode 22 relative to the first transparent electrode 12. As a result, the deposited metal layer 52a in FIG. 4 may be dissolved into the electrolyte solution 40. After a predetermined amount of time, the deposited metal layer 52a may be completely dissolved such that the first transparent electrode 12 contacts the electrolyte solution 40. The reversible electrolyte mirror 101 becomes the transparent state, and light L incident through the first substrate 10 may pass through the reversible electrochemical mirror 101.

The erasure operation in the reversible electrochemical mirror in FIG. 4 may proceed via reactions such as those below when the counter electrode material layer 30 is composed of tungsten oxide, the metal layer 52 is composed of silver, and the electrolyte solution 40 includes silver nitrate ($AgNO_3$) and lithium bromide (LiBr).

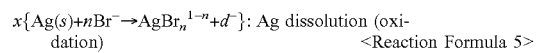
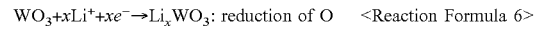

$x\{Ag(s)+nBr^- \rightarrow AgBr_n^{1-n}+d^-\}$: Ag dissolution (oxidation)  ⟨Reaction Formula 5⟩

$WO_3+xLi^++xe^- \rightarrow Li_xWO_3$: reduction of O  ⟨Reaction Formula 6⟩

In Reaction Formula 5, the silver (Ag) forming the deposited metal layer 52a may dissolve and thereby change into silver ions ($Ag^+$) that form complex ions with bromide ions ($Br^-$). In Reaction Formula 6, a tungsten oxide film forming the counter electrode material layer 30 may receive electrons from lithium ions ($Li^+$) in the electrolyte solution 40 and thereby bond with the lithium ions ($Li^+$). The tungsten oxide film bonded with the lithium ions ($Li^+$) may be blue. Here, the counter electrode material layer 30 may change into a state 30a that has received lithium ions and electrons that were inside the electrolyte solution 40.

Referring to FIG. 2, in order for the reversible electrochemical mirror 101 to become a mirror state, a negative voltage may be applied to the first transparent electrode 12 and a positive voltage may be applied to the second transparent electrode 22 in the reversible electrochemical mirror 101 in FIG. 5. A positive electrodeposition voltage V1 may be applied to the second transparent electrode 22 relative to the first transparent electrode 12. Thus, in the state illustrated in FIG. 2, metal ions in the electrolyte solution 40 may receive electrons from the first transparent electrode 12, thereby being reduced and forming an electrodeposited metal layer 52 on the first transparent electrode 12 as illustrated in FIG. 3. Accordingly, the reversible electrochemical mirror 101 once again becomes a mirror state, and light L incident through the first substrate 10 may be reflected at the surface of the metal layer 52.

Here, the electrodeposition operation in the reversible electrochemical mirror 101 in FIG. 4 may proceed via reactions such as those below when the counter electrode material layer 30 is composed of tungsten oxide, the metal layer 52 is composed of silver, and the electrolyte solution includes silver nitrate ($AgNO_3$) and lithium bromide (LiBr).

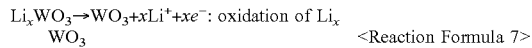
$Li_xWO_3 \rightarrow WO_3 + xLi^+ + xe^-$: oxidation of $Li_x WO_3$  <Reaction Formula 7>

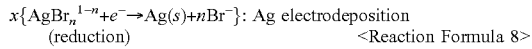
$x\{AgBr_n^{1-n} + e^- \rightarrow Ag(s) + nBr^-\}$: Ag electrodeposition (reduction)  <Reaction Formula 8>

In Reaction Formula 7, the application of a positive voltage to the second transparent electrode 22 may cause the tungsten oxide film bonded with the lithium ions to release electrons and lithium ions into the electrolyte solution 40. Thus, lithium ions ($Li^+$) and electrons may be separated from the tungsten oxide film and travel into the electrolyte solution 40. In Reaction Formula 8, a negative voltage applied to the first transparent electrode 12 causes the silver ions ($Ag^+$) in the electrolyte solution 40 to obtain electrons and be electrodeposited/re-formed on the first transparent electrode 12. After all of the electrons received by the tungsten oxide film via Reaction Formula 6 are released into the electrolyte solution 40 via Reaction Formula 7, the electrodeposition of silver no longer proceeds, and electrodeposition stops. That is, even if the electrodeposition voltage V1 continues to be applied, continued consumption of current may not occur when electrodeposition is completed. Moreover, even if power is cut off from the reversible electrochemical mirror 101 following the silver electrodeposition operation, self-erasure does not occur inside the electrolyte solution 40. The oxidation/reduction reactions of Reaction Formulas 5 and 6, and the oxidation/reduction reactions of Reaction Formulas 7 and 8 may be almost completely reversible. The reversible electrochemical mirror 101 of the present embodiment may have excellent bistability.

In the reversible electrochemical mirror 101 in FIG. 4, a pre-electrodeposited metal layer 52a is further included such that the counter electrode material layer 30 may directly participate in the exchange of charges required for reversible electrodeposition reactions. Thus, since dissolution/electrodeposition reactions occur without the intervention of $Br_3^-$, self-dissolution caused by $Br_3^-$ does not occur. Therefore, in the reversible electrochemical mirror 101 in FIG. 4, there is no current consumption caused by self-dissolution, and the reversible electrochemical mirror 101 has excellent bistability. Moreover, since silver dissolution and electrodeposition are not determined by the diffusion of $Br_3^-$, fast operation speeds may be achieved.

The manufacturing process of the reversible electrochemical mirror in FIG. 4 is as follows. A first substrate 10 and a second substrate 20 are prepared. A first transparent electrode 12 and a second transparent electrode 22 are formed on the first substrate 10 and the second substrate 20, respectively. The first transparent electrode 12 and second transparent electrode 22 may be formed as ITO or FTO by a deposition, coating, or lamination process. A deposited metal layer 52a may be formed on the first transparent electrode 12 by a deposition process such as sputtering, chemical vapor deposition (CVD), or physical vapor deposition (PVD). A counter electrode material layer 30 may be formed on the second transparent electrode 22 by a deposition process such as sputtering, CVD, or PVD. The first substrate 10 and the second substrate 20 may be arranged such that the deposited metal layer 52a and the counter electrode material layer 30 are facing each other, and the first substrate 10 and second substrate 20 may be attached or joined with a spacer or partition wall interposed therebetween. An electrolyte solution 40 may be injected between the deposited metal layer 52a and the counter electrode material layer 30.

Manufacturing Example

Soda lime glass was used for the first substrate 10 and second substrate 20, and an ITO thin film was used for the first transparent electrode 12 and second transparent 22 in FIG. 4. 50 mM of silver nitrate ($AgNO_3$) and 1.0 M of lithium bromide (LiBr) were dissolved in dimethyl sulfoxide (DMSO), and 10 wt % of polyvinyl butyral (PVB) was added as a polymer to prepare an electrolyte solution 40. Copper ions were not added to the electrolyte solution 40. A tungsten oxide film ($WO_3$) was formed as a counter electrode material layer 30 on the second transparent electrode 22. The tungsten oxide film ($WO_3$) was formed to a thickness of 1.8 m through a reactive sputtering process using a tungsten target and a gas mixture of argon and oxygen under a process pressure of 20 mTorr. A silver (Ag) thin film was formed as a deposited metal layer 52a on the first transparent electrode 12. The silver thin film was deposited by a sputtering process using a silver (Ag) target and argon gas under a process pressure of 5 mTorr. The surface resistance of the silver thin film was 0.52 Ω/square, which corresponds to a thickness of about 30.5 nm, as converted using the resistivity of silver.

The reversible electrochemical mirror of the present embodiment was obtained by preparing each of an electrode obtained by depositing Ag on an indium tin oxide (ITO)-deposited substrate and an electrode obtained by depositing $WO_3$ on an indium tin oxide-deposited substrate, interposing a spacer, attaching the first substrate 10 and the second substrate 20, thereby forming an empty space between the first substrate 10 and second substrate 20, and filling the empty space with the electrolyte solution 40. The spacer may have a thickness of about 120 m. The operating surface area of the reversible electrochemical mirror manufactured as such was about 2.34 $cm^2$.

To place the reversible electrochemical mirror in a transparent state, a voltage of +1.8 V was applied as an erasure voltage V3 to the first transparent electrode 12 relative to the second transparent electrode 22, thereby dissolving all of the silver of the deposited metal layer 52a into the electrolyte solution 40.

To place the reversible electrochemical mirror in a mirror state, a voltage of −1.0 V was applied as an electrodeposition voltage V1 to the first transparent electrode 12 relative to the second transparent electrode 22, thereby electrodepositing silver on the first transparent electrode 12.

The tungsten oxide film may be one of electrochromic materials that change color as a result of oxidation/reduction. If a transparent ion storage material, such as cerium oxide, which does not display color even when oxidized/reduced is used for the counter electrode material layer 30, the reversible electrochemical mirror may have an extremely high reflectance in a transparent state.

Figure 6:
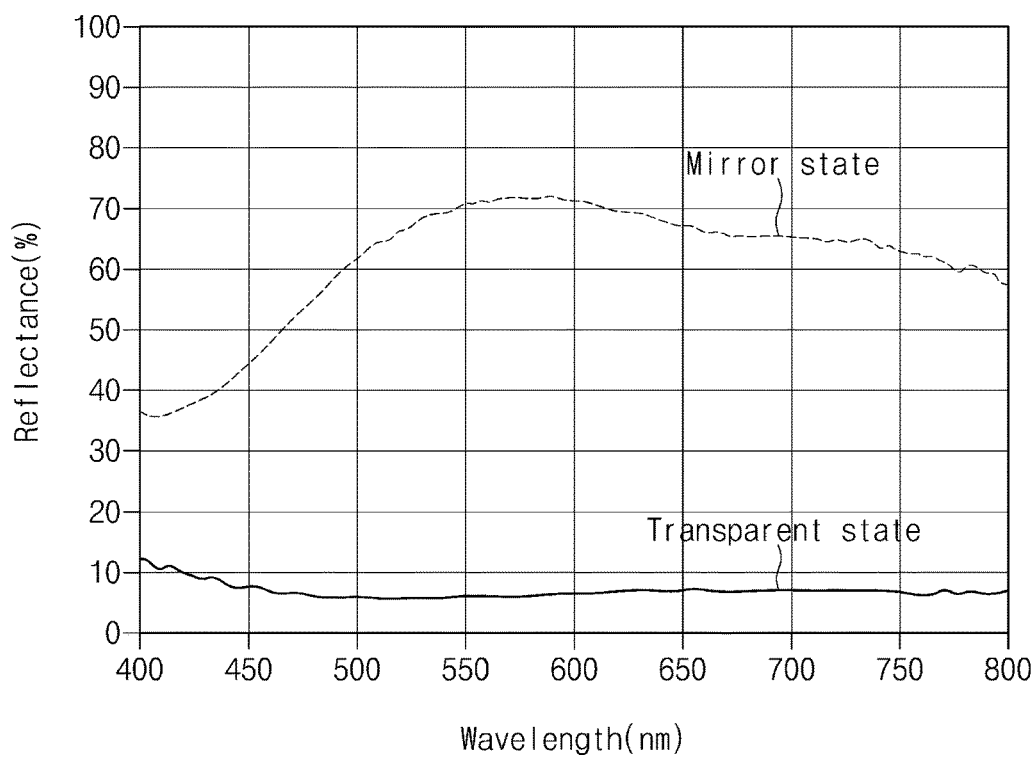
FIG. 6 is a graph showing the reflectance of a reversible electrochemical mirror manufactured in a manufacturing example of an embodiment of the inventive concept according to the wavelength of light.

FIG. 6 is a graph showing the reflectance of the reversible electrochemical mirror manufactured in the manufacturing example of an embodiment of the inventive concept according to the wavelength of light.

Referring to FIG. 6, the dashed line represents a mirror state and the solid line represents a transparent state. It can be observed through FIG. 6 that excellent mirror states and transparent states may be reversibly formed at various wavelengths of light.

Figure 7:
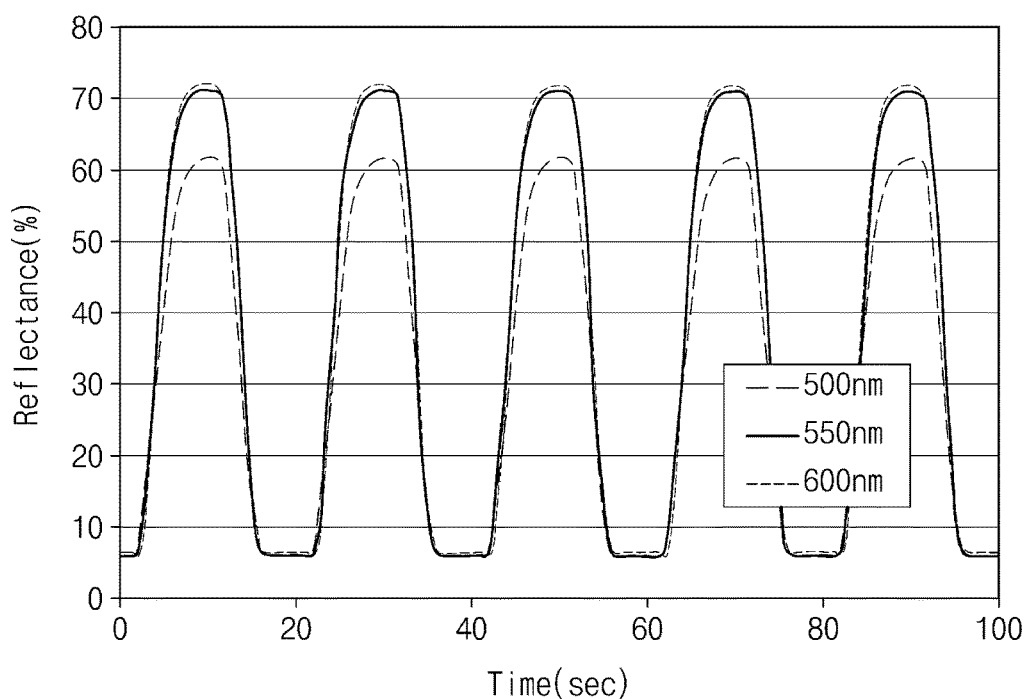
FIG. 7 is a graph showing reflectance change properties measured by repeating dissolution and electrodeposition operations of silver on a reversible electrochemical mirror manufactured in a manufacturing example of an embodiment of the inventive concept.

FIG. 7 is a graph showing reflectance change properties measured by repeating dissolution and electrodeposition operations of silver on the reversible electrochemical mirror manufactured in the manufacturing example of an embodiment of the inventive concept.

Referring to FIG. 7, 500 nm, 550 nm, and 600 nm each refer to a wavelength of light incident on the reversible electrochemical mirror. Electrodeposition operations were carried out by applying −1.0 V as the electrodeposition voltage V1 of the reversible electrochemical mirror to the first transparent electrode 12 for 10 seconds, and dissolution operations were carried out by applying +1.8 V as the erasure voltage V3 to the first transparent electrode 12 for 10 seconds. FIG. 7 shows the reflectance, measured while repeating the electrodeposition and dissolution operations, according to time. It can be observed through FIG. 7 that the reversible electrochemical mirror according to embodiments of the inventive concept exhibits extremely fast switching properties and clearly distinct mirror and transparent states.

Figure 8:
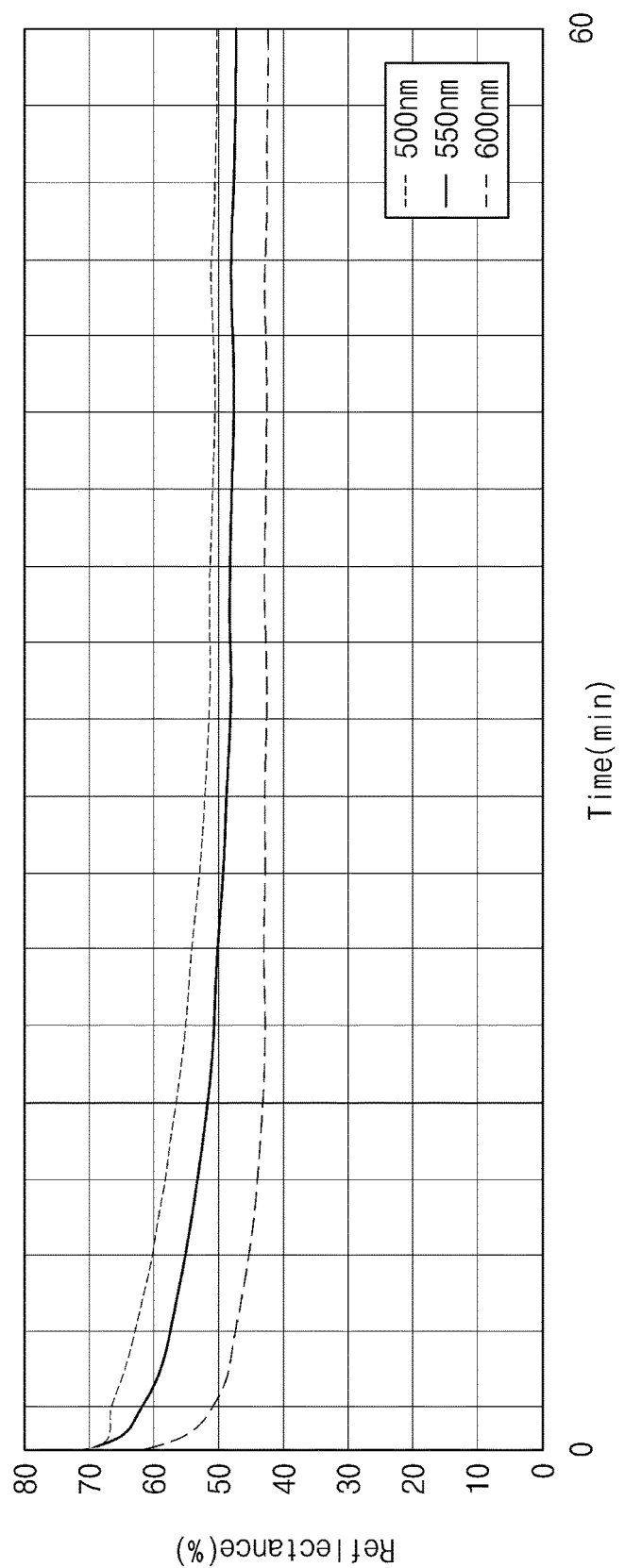
FIG. 8 is a graph showing the change in reflectance with time after placing a reversible electrochemical mirror manufactured in a manufacturing example of an embodiment of the inventive concept in a mirror state and then cutting off power.

FIG. 8 is a graph showing the change in reflectance with time after placing the reversible electrochemical mirror manufactured in the manufacturing example of an embodiment of the inventive concept in a mirror state and then cutting off power.

Referring to FIG. 8, the reversible electrochemical mirror maintains a mirror state even after power has been cut off. In particular, it is observed that a reflectance of at least 50% is maintained for 1 hour for a wavelength of 600 nm. Thus, it can be seen that the reversible electrochemical mirror according to embodiments of the inventive concept has excellent bistability.

A reversible electrochemical mirror according to embodiments of the inventive concept may have excellent bistability and fast switching properties. Moreover, the reversible electrochemical mirror according to embodiments of the inventive concept may be operated at low power and may maintain a stable mirror state or transparent state even when power is cut off. Thus, the surface area of the reversible electrochemical mirror may be easily increased.

What is claimed is:

1. A reversible electrochemical mirror comprising:
   a first substrate;
   a second substrate facing the first substrate;
   a first transparent electrode disposed on the first substrate and facing the second substrate;
   a second transparent electrode disposed on the second substrate and facing the first transparent electrode;
   an electrolyte solution interposed between the first transparent electrode and the second transparent electrode; and
   a counter electrode material layer disposed on the second transparent electrode and contacting the electrolyte solution,
   wherein the counter electrode has a planar surface contacting the electrolyte solution,
   wherein the counter electrode includes one of an ion storage material and an electrochromic material, and
   wherein the electrolyte solution includes a first chemical and a second chemical, such that when a voltage having a first polarity is applied between the first transparent electrode and the second transparent electrode, a metal in the first chemical forms a metal layer on the first transparent electrode, and when a voltage having a second polarity opposite the first polarity is applied between the first transparent electrode and the second transparent electrode, the metal layer dissolves into the electrolyte solution and the counter electrode absorbs an ion from the second chemical.

2. The reversible electrochemical mirror of claim 1, wherein the counter electrode material layer includes at least one out of tungsten oxide ($WO_3$), cerium oxide ($CeO_2$), titanium oxide ($TiO_2$), nickel oxide (NiO), molybdenum oxide ($MoO_3$), cobalt oxide ($CoO_2$), iridium oxide ($IrO_2$), and tin oxide ($SnO_2$).

3. The reversible electrochemical mirror of claim 1, wherein the metal layer includes silver (Ag) or bismuth (Bi), and the electrolyte solution includes silver ions or bismuth ions.

4. The reversible electrochemical mirror of claim 3, wherein the second chemical in the electrolyte solution includes lithium ions.

5. The reversible electrochemical mirror of claim 1, wherein the electrolyte solution further includes at least one solvent selected from water, dimethyl sulfoxide (DMSO), propylene carbonate, and ethylene glycol.

6. The reversible electrochemical mirror of claim 1, wherein the electrolyte solution does not include copper ions.

7. The reversible electrochemical mirror of claim 1, wherein the first and second transparent electrodes include ITO or FTO.

8. The reversible electrochemical mirror of claim 1, wherein, when a negative voltage is applied to the first transparent electrode, the metal layer is electrodeposited on the first transparent electrode such that the reversible electrochemical mirror becomes a mirror state, and when a negative voltage is applied to the second transparent electrode, the metal layer dissolves into the electrolyte solution such that the reversible electrochemical mirror becomes a transparent state.

* * * * *